(12) United States Patent
Thakkar et al.

(10) Patent No.: US 8,954,864 B1
(45) Date of Patent: Feb. 10, 2015

(54) CONTACT LIST INTEGRATED WITH SOCIAL NETWORK

(75) Inventors: Nishant Atul Thakkar, Seattle, WA (US); Kobi Reiter, Seattle, WA (US); Sean Edward Purcell, San Francisco, CA (US); Matthew Frederick Hillman, Seattle, WA (US); Corinna Hinke, San Francisco, CA (US)

(73) Assignee: Google Inc., Mountain View, CA (US)

( * ) Notice: Subject to any disclaimer, the term of this patent is extended or adjusted under 35 U.S.C. 154(b) by 43 days.

(21) Appl. No.: 13/615,569

(22) Filed: Sep. 13, 2012

(51) Int. Cl.
*G06F 3/00* (2006.01)
*G06Q 50/00* (2012.01)
*G06Q 10/10* (2012.01)

(52) U.S. Cl.
CPC .............. *G06Q 50/01* (2013.01); *G06Q 10/107* (2013.01)
USPC ............................ 715/753; 715/739; 715/752

(58) Field of Classification Search
CPC .. G06Q 50/01; G06Q 10/107; H06L 29/1215; H04L 51/32
USPC .......................................... 715/753, 739, 752
See application file for complete search history.

(56) References Cited

U.S. PATENT DOCUMENTS

| | | | |
|---|---|---|---|
| 7,418,663 B2 * | 8/2008 | Pettinati et al. ................ | 715/739 |
| 7,583,671 B2 * | 9/2009 | Ramani et al. ................. | 370/392 |
| 8,412,780 B2 * | 4/2013 | Fox et al. ....................... | 709/206 |
| 8,577,895 B2 * | 11/2013 | Gupta et al. ................... | 707/748 |
| 8,600,360 B1 * | 12/2013 | Patvarczki et al. ........... | 455/414.3 |
| 8,676,892 B2 * | 3/2014 | Su et al. ......................... | 709/204 |
| 2005/0198172 A1 * | 9/2005 | Appelman et al. ............ | 709/206 |
| 2006/0224675 A1 * | 10/2006 | Fox et al. ....................... | 709/206 |
| 2009/0186597 A1 * | 7/2009 | Lin et al. ........................ | 455/405 |
| 2010/0082693 A1 * | 4/2010 | Hugg et al. .................... | 707/798 |
| 2011/0252011 A1 * | 10/2011 | Morris et al. .................. | 707/706 |
| 2012/0110088 A1 * | 5/2012 | Su et al. ......................... | 709/205 |
| 2013/0238697 A1 * | 9/2013 | Mehta et al. ................... | 709/204 |
| 2014/0279034 A1 * | 9/2014 | Samuel ....................... | 705/14.64 |

* cited by examiner

*Primary Examiner* — David Phantana Angkool

(57) ABSTRACT

Systems, methods and computer readable media for integrating a contact list with a social network are disclosed. Some implementations can include displaying a user interface that permits a user to add a profile linked to a contact to one or more selected groups of the social network. The user interface can then be updated to display the groups of the social network to which the profile has been added.

20 Claims, 5 Drawing Sheets

CONTACT LIST INTEGRATED WITH SOCIAL NETWORK

BACKGROUND

A contact list can include one or more data records each representing a contact of a user. A contact data record can be associated with a person, business, organization or other entity. A contact data record can include one or more data items corresponding to the contact, such as name, title, phone number(s), email address, physical address and other information related to the contact. Contacts can be viewed in a contact list user interface. Some contact list user interfaces may show contact information such as name, email address, mailing address, phone number and the like.

Social networks can include a plurality of members each represented by one or more profiles within the social network. A social network profile can be associated with one or more items of information of the member, including but not limited to email address and phone number. Social networks can permit members to communicate with each other (e.g., via posts or status updates), share information such as photos and videos and comment on the information shared or posted by other members. Social networks can also permit a member to define a private group. The private group can include other members of the social network and non-members of the social network. Some social network user interfaces may show social network information such as a member's groups.

Social networks contain information that can be more publicly available to other member, where as a contact list can be a more private set of data owned and viewable to the user that the contact list belongs to. While some contact list interfaces may permit a user to define and display categories of contacts, some contact list user interfaces may not provide an integrated user interface displaying contact information together with social network information. Further, some contact list user interfaces may not provide a capability for a contact list user to add a contact to one or more of the user's groups in the social network from within the contact list user interface.

SUMMARY

Some implementations relate generally to contact lists and, more particularly, to methods, systems and computer readable media for integrating contact lists and social networks.

One or more implementations can include a computer-implemented method comprising providing, for display to a user, using one or more processors, a contact list user interface. The contact list user interface can be adapted to permit the user to add or remove a profile linked to a contact from a contact list to one or more groups of a social network. The method can also include receiving, using the one or more processors, from the user an indication of one or more selected groups of the social network to which the profile is to be added. The method can further include adding, using the one or more processors, the profile to the one or more selected groups of the social network. The method can include updating, using the one or more processors, the contact list user interface to indicate that the profile linked to the contact has been added to the one or more selected groups of the social network.

The one or more groups of the social network can include groups the user has created within the social network. The contact can be linked to a plurality of social network profiles. The contact list user interface can be adapted to permit the user to separately add each of the plurality of social network profiles to the one or more selected groups.

The method can also include displaying social network groups that the user has created within the social network. The method can further include displaying a list of contacts and social network groups that each contact is associated with. The method can include displaying a user interface element for creating a new group within the social network to which the profile is to be added. The contact can be linked to the profile of the social network via one or more of an email address, a profile uniform resource locator (URL), a phone number, a name, a mailing address and a company of the contact.

One or more implementations can include a processor and a data storage device coupled to the processor. The data storage device can contain software instructions that, when executed by the processor, cause the processor to perform operations. The operations can include providing, for display to a user, a contact list user interface corresponding to a contact list application. The contact list user interface can be adapted to permit the user to add or remove a profile linked to a contact from a contact list to one or more groups of a social network. The operations can also include receiving, from the user, an indication of one or more selected groups of the social network to which the profile is to be added.

The operations can further include adding the profile to the one or more selected groups of the social network. The operations can include updating the contact list user interface to indicate that the profile linked to the contact has been added to the one or more selected groups of the social network.

The one or more groups of the social network can include groups the user has created within the social network. The contact can be linked to a plurality of social network profiles. The contact list user interface can be adapted to permit the user to separately add each of the plurality of social network profiles to the one or more selected groups.

The operations can further include displaying social network groups that the user has created within the social network. The operations can also include displaying a list of contacts and social network groups that each contact is associated with. The operations can include displaying a user interface element for creating a new group within the social network to which the profile is added. The contact can be linked to the profile of the social network via one or more of an email address, a profile uniform resource locator (URL), a phone number, a name, a mailing address and a company of the contact.

One or more implementations can include a nontransitory computer readable medium having stored thereon software instructions that, when executed by a processor, cause the processor to perform operations. The operations can include providing, for display to a user, a contact list user interface corresponding to a contact list application. The contact list user interface can be adapted to permit the user to add or remove a profile linked to a contact from a contact list to one or more groups of a social network.

The operations can also include receiving, from the user, an indication of one or more selected groups of the social network to which the profile is to be added. The operations can further include adding the profile to the one or more selected groups of the social network. The operations can also include updating the contact list user interface to indicate that the profile linked to the contact has been added to the one or more selected groups of the social network.

The one or more groups of the social network can include groups the user has created within the social network. The contact can be linked to a plurality of social network profiles. The contact list user interface can be adapted to permit the user to separately add each of the plurality of social network profiles to the one or more groups.

The operations can further comprise displaying social network groups that the user has created within the social network. The operations can further comprise displaying a list of contacts and social network groups that each contact is associated with. The operations can also comprise displaying a user interface element for creating a new group within the social network to which the profile is added.

DETAILED DESCRIPTION

Figure 1:
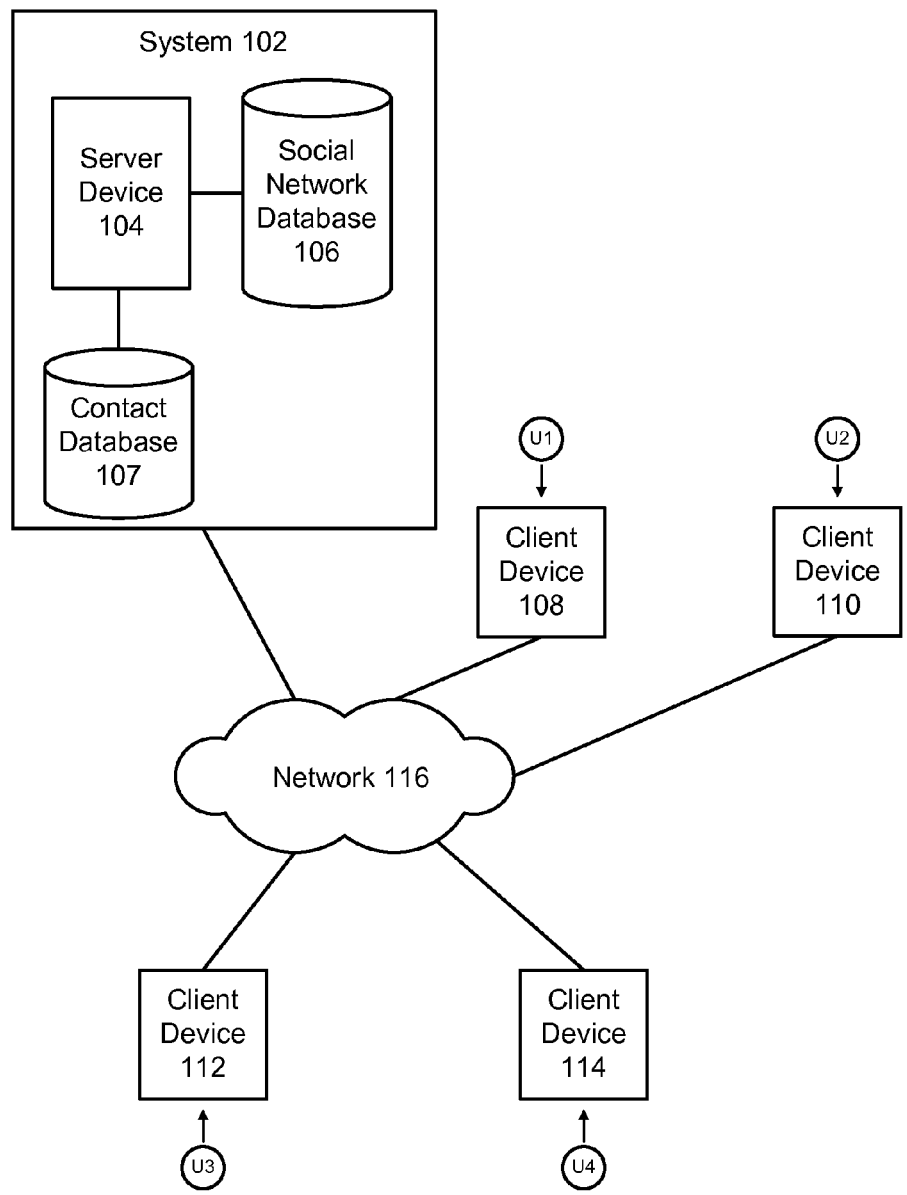
FIG. 1 is a diagram of an example social network environment in accordance with at least one implementation.

Some implementations can include a method of integrating a contact list with a social network. The method can include displaying a user interface that permits a user to add a social network profile of a contact to one or more selected groups of the social network. The user interface can then be updated to display the groups of the social network to which the contact profile has been added.

In some implementations, the method can include generating, at a computer system, a user interface to permit the user to add a social network profile of a contact from a contact list to one or more groups of the social network. The system can receive an indication of a selection of one or more groups of the social network to which the contact social network profile is to be added. For example, the profile of a contact from work may be added to the user's group of work colleagues and, if the contact has a shared interest with the user (e.g., jogging), the profile of the contact can be added to the user's jogging group within the social network. The user interface includes an element for picking groups from the social network to which one or more profiles of the contact can be added.

Once the system receives the indication from the user interface, the system adds the profile of the contact to the one or more groups of the social network. The system then updates the user interface to show that the profile has been added to the one or more groups of the social network. The one or more groups of the social network can include groups the user has created within the social network.

A contact can be linked to one or more social network profiles (e.g., social network profiles linked to different email addresses, phone numbers or the like associated with the contact), and the user interface can permit the user to separately add each of the social network profiles to the one or more groups. Also, a contact can be linked to a profile via other information such as URLs, or individual fields or combinations of fields such as name, street address, job title, company, or the like. Each profile can be added to the same or different groups. Along with each contact, the user interface can display social network groups that a profile of the contact is a member of. Also, other groups can be displayed that may be related or unrelated to the groups the contact is a member of, and the contact can be added to one or more of the other groups.

The user interface can also include an element for creating a new group within the social network to which the contact is to be added. For example, if the contact is a friend from an exercise class, the user can create a new group within the social network to include friends from that exercise class. The contact list can be updated to indicate that the contact is a member of the user's exercise class group within the social network.

Some implementations permit a user to manage (e.g., add, edit and/or delete) social network group membership for one or more profiles from within a contact list application. Some implementations can also permit a user to create a social network group from within a contact list application.

As shown in FIG. 1, a social network environment 100 includes a system 102 having a server device 104, a social network database 106 and a contact database 107. One or more client devices (108-114) can access the social network system 102 via a network 116.

The client devices (108-114) can include, but are not limited to, a desktop computer, a laptop computer, a portable computer, a tablet computing device, a smartphone, a feature phone, a personal digital assistant, a media player, an electronic book reader, an entertainment system of a vehicle, a wearable computing device or the like. The network 116 can be a wired or wireless network, and can include, but is not limited to, a WiFi network, a local area network, a wide area network, the Internet, or a combination of the above.

In operation, a plurality of users (U1-U4) can access the social network system 102 via respective client devices (108-114). The users can access contact lists and/or social network information from the social network system 102. The social network information can be stored in the social network database 106. The contact lists can be stored in the contact database 107.

The system 102 can also permit each user to view and interact with a contact list integrated with social network information, as described in greater detail below with respect to FIGS. 2-5.

Figure 2:
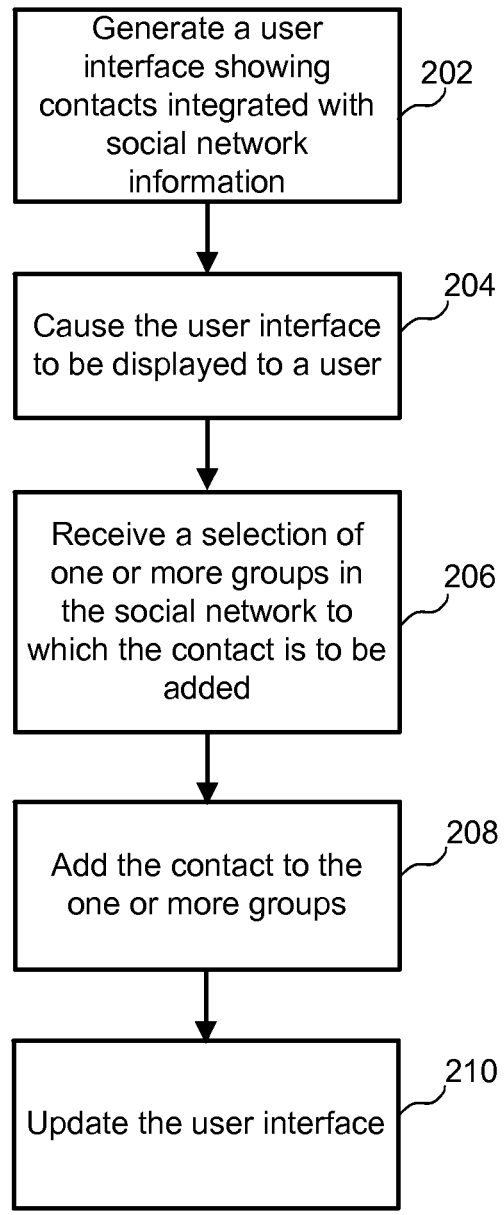
FIG. 2 is a flowchart of an example method of integrating a contact list and a social network in accordance with at least one implementation.

FIG. 2 is a flowchart of an example method of integrating a contact list and a social network in accordance with at least one implementation. Processing begins at 202, where a system (e.g., system 102 of FIG. 1) generates a user interface showing contacts integrated with social network information. Processing continues to 204.

At 204, the system causes the user interface to be displayed on a display of a client device (e.g., one or more of client devices 108-114). Processing continues to 206.

At 206, the system receives a selection of one or more groups in the social network to which a profile linked to a contact is to be added. For example, a user (e.g., U1) may select a contact that is in an exercise class with the user and then select a group of the exercise class members in the social network. Processing continues to 208.

At 208, the system adds the profile linked to the contact to the one or more selected groups. For example, the information indicating that the profile linked to the contact has been added to the exercise group can be stored in the social network database 106. Processing continues to 210.

At 210, the system updates (or refreshes) the user interface being displayed to reflect the addition of the contact to the one or more groups.

It will be appreciated that 202-210 can be repeated in whole or in part in order to accomplish a contemplated contact integration with social network information task.

Figure 3:
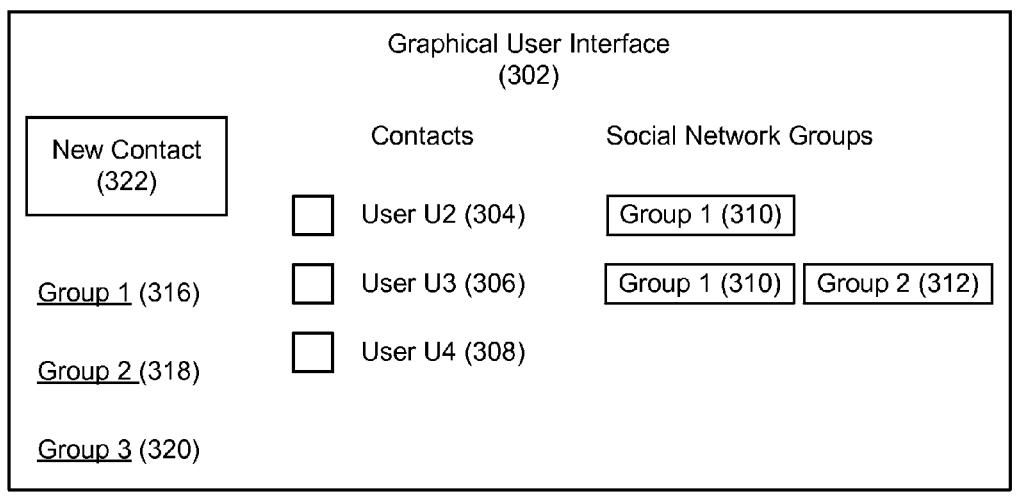
FIG. 3 is an example graphical user interface with contacts integrated with social network information in accordance with at least one implementation.

FIG. 3 is an example graphical user interface 302 with contacts integrated with social network information in accordance with at least one implementation. In particular, the user interface 302 includes a listing of contacts (304-308), an indication of social network groups (310-312), elements to filter the display to show contacts belonging to a social network group (316-320), and a new contact button 322.

In operation, a system can generate the user interface 302 and cause it to be displayed on a user device. A user can filter the contact list to show only those contacts linked to profiles belonging to specific groups by selecting one of the group filter elements (316-320). The user can also add a new contact using the new contact button 322.

Also, the user can view the contact list and select a contact to view additional details about. An example contact detail screen is shown in FIG. 4 and discussed below.

Figure 4:
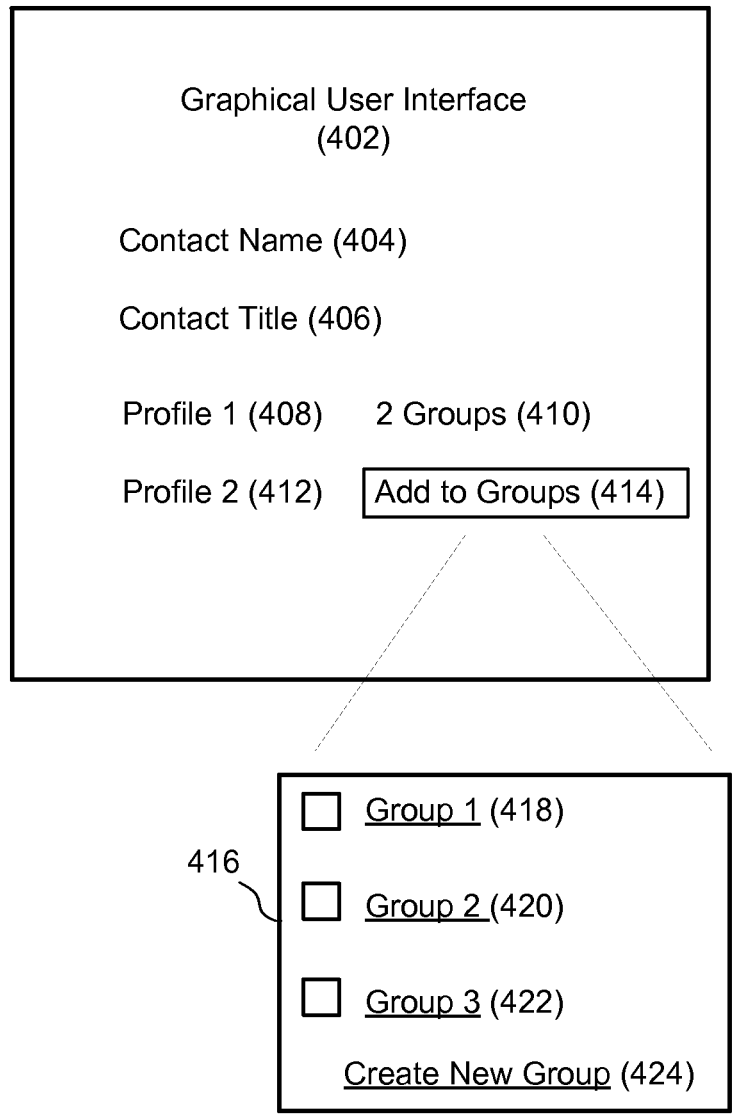
FIG. 4 is an example contact detail view user interface with an element for adding the contact to a social network group in accordance with at least one implementation.

FIG. 4 is an example contact detail view user interface 402 with an element for adding a profile of the contact to a social network group in accordance with at least one implementation. In particular the user interface 402 includes contact name 404, contact title 406, a first profile 408, a second profile 412, a Groups element 410 and an Add to Groups element 414. The first profile 408 and the second profile 412 can be identified by email addresses, phone number, social network user names or the like.

In operation, the user can select the Groups element 410 to view the group or groups that are associated with the first profile 408 of the contact. Element 410, when clicked, can also display a group selection box 416 to change groups the profile is a member of. The user can also select the Add to Groups element 414 to add the second profile 412 to one or more groups within the social network.

When the Add to Groups element 414 is selected, the group selection box 416 can be displayed. The group selection box 416 includes social network group selection elements (418-422). The groups displayed can include the groups that the user has created within the social network. Also, the group selection box 416 can include a Create New Group element 424.

The Create New Group element 424 permits a user to create a new group within the social network and add the contact profile to that newly created group. The new group can be stored in a social network database (e.g., social network database 106 shown in FIG. 1).

Figure 5:
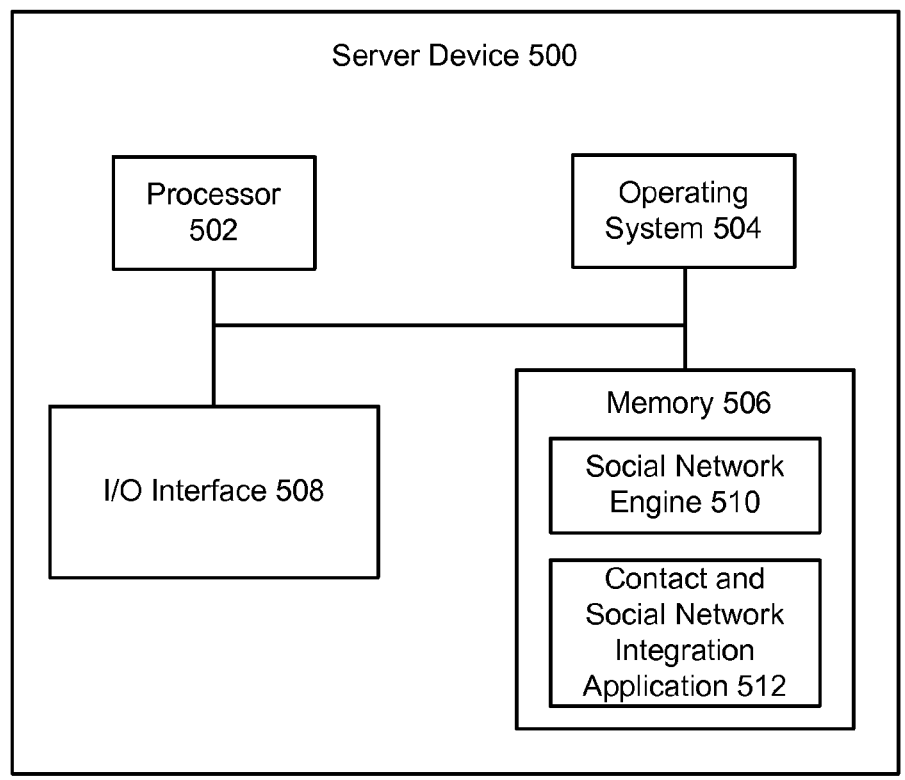
FIG. 5 is a diagram of an example server system in accordance with at least one implementation.

FIG. 5 is a diagram of an example server device 500 that can be used for contact and social network integration in accordance with at least one implementation. The server device 500 includes a processor 502, operating system 504, memory 506 and I/O interface 508. The memory 506 can include a social network engine 510 and an application program for integrating contact lists and a social network 512.

In operation, the processor 502 may execute the application 512 stored in the memory 506. The application 512 can include software instructions that, when executed by the processor, cause the processor to perform contact and social network integration operations in accordance with the present disclosure (e.g., performing one or more of steps 202-210 described above).

The application program 512 can operate in conjunction with the social network engine 510 and the operating system 504. The server (e.g., 104 and/or 500) can include, but is not limited to, a single processor system, a multi-processor system (co-located or distributed), a cloud computing system, or a combination of the above.

Some implementations can provide a contact list showing one or more people that a user is connected to in a social network, even though these people may not be a contact. Also, some implementations can permit a user to convert a contact group to a social network group.

Some implementations can also permit a user to choose contact groups and social network groups within the same user interface. Some implementations can also provide an integrated search interface that can return results from both contacts and social network connections.

Some implementations can permit a user to add a contact to a social network by email (or phone, or the like), when that email doesn't correspond to a member on the social network (e.g., an "off-network" group add).

The data storage, memory and/or computer readable medium can be a magnetic storage device (hard disk drive or the like), optical storage device (CD, DVD or the like), electronic storage device (RAM, ROM, flash, or the like). The software instructions can also be contained in, and provided as, an electronic signal.

Moreover, implementations of the disclosed method, system, and computer readable media can be implemented in software executed on a programmed general purpose computer, a special purpose computer, a microprocessor, or the like.

It is, therefore, apparent that there is provided, in accordance with the various embodiments disclosed herein, systems, methods and computer readable media for automating social network activities.

While the disclosed subject matter has been described in conjunction with a number of implementations, it is evident that many alternatives, modifications and variations would be or are apparent to those of ordinary skill in the applicable arts. Accordingly, Applicants intend to embrace all such alternatives, modifications, equivalents and variations that are within the spirit and scope of the disclosed subject matter.

What is claimed is:

1. A computer-implemented method comprising:
providing, for display to a user, using one or more processors, a contact list user interface, wherein the contact list user interface is adapted to permit a user to link a contact in the contact list to one or more social network profiles and to permit the user to separately add each of the social network profiles to one or more groups of a social network, wherein each profile linked to a corresponding contact is displayed on the contact list user interface with the corresponding contact;
receiving, using the one or more processors, from the user an indication of one or more selected groups of the social network to which a selected profile is to be added;
adding, using the one or more processors, the selected profile to the one or more selected groups of the social network; and
updating, using the one or more processors, the contact list user interface to indicate that the selected profile linked to the contact has been added to the one or more selected groups of the social network.

2. The method of claim 1, wherein the one or more groups of the social network include groups the user has created within the social network.

3. The method of claim 1, wherein the contact is linked to a plurality of social network profiles, and wherein the contact list user interface is adapted to permit the user to separately add each of the plurality of social network profiles to the one or more selected groups.

4. The method of claim 1, wherein the contact list user interface is further adapted to permit the user to remove the profile from one or more selected groups.

5. The method of claim 1, further comprising displaying social network groups that the user has created within the social network and displaying a list of contacts and social network groups that each contact is associated with.

6. The method of claim 1, further comprising displaying a user interface element for creating a new group within the social network to which the profile is to be added.

7. The method of claim 1, wherein the contact is linked to the profile of the social network via one or more of an email address, a profile uniform resource locator (URL), a phone number, a name, a mailing address and a company of the contact.

8. A system comprising:
- a processor; and
- a data storage device coupled to the processor, the data storage device containing software instructions that, when executed by the processor, cause the processor to perform operations including:
    - providing, for display to a user, a contact list user interface corresponding to a contact list application, wherein the contact list user interface is adapted to permit a user to link a contact in the contact list to one or more social network profiles and to permit the user to separately add or remove each of the social network profiles linked to a contact from a contact list to one or more groups of a social network, wherein each profile linked to a corresponding contact is displayed on the contact list user interface with the corresponding contact;
    - receiving, from the user, an indication of one or more selected groups of the social network to which a selected profile is to be added;
    - adding the selected profile to the one or more selected groups of the social network; and
    - updating the contact list user interface to indicate that the selected profile linked to the contact has been added to the one or more selected groups of the social network.

9. The system of claim 8, wherein the one or more groups of the social network include groups the user has created within the social network.

10. The system of claim 8, wherein the contact is linked to a plurality of social network profiles, and wherein the contact list user interface is adapted to permit the user to separately add each of the plurality of social network profiles to the one or more selected groups.

11. The system of claim 8, wherein the operations further include displaying social network groups that the user has created within the social network.

12. The system of claim 8, wherein the operations further include displaying a list of contacts and social network groups that each contact is associated with.

13. The system of claim 8, wherein the operations further include displaying a user interface element for creating a new group within the social network to which the profile is added.

14. The system of claim 8, wherein the contact is linked to the profile of the social network via one or more of an email address, a profile uniform resource locator (URL), a phone number, a name, a mailing address and a company of the contact.

15. A nontransitory computer readable medium having stored thereon software instructions that, when executed by a processor, cause the processor to perform operations comprising:
- providing, for display to a user, a contact list user interface corresponding to a contact list application, wherein the contact list user interface is adapted to permit a user to link a contact in the contact list to one or more social network profiles and to permit the user to separately add or remove each of the social network profiles linked to a contact from a contact list to one or more groups of a social network;
- receiving, from the user, an indication of one or more selected groups of the social network to which a selected profile is to be added;
- adding the selected profile to the one or more selected groups of the social network; and
- updating the contact list user interface to indicate that the selected profile linked to the contact has been added to the one or more selected groups of the social network.

16. The nontransitory computer readable medium of claim 15, wherein the one or more groups of the social network include groups the user has created within the social network.

17. The nontransitory computer readable medium of claim 15, wherein the contact is linked to a plurality of social network profiles, and wherein the contact list user interface is adapted to permit the user to separately add each of the plurality of social network profiles to the one or more selected groups.

18. The nontransitory computer readable medium of claim 15, wherein the operations further comprise displaying social network groups that the user has created within the social network.

19. The nontransitory computer readable medium of claim 15, wherein the operations further comprise displaying a list of contacts and social network groups that each contact is associated with.

20. The nontransitory computer readable medium of claim 15, wherein the operations further comprise displaying a user interface element for creating a new group within the social network to which the profile is added.

\* \* \* \* \*